2 Sheets—Sheet 1.

J. W. CUBBAGE.

LEATHER SCOURING AND WRINGING MACHINE.

No. 9,824. Reissued Aug. 2, 1881.

Witnesses:
C. M. Giles
M. Phillips

Inventor
John W. Cubbage
By R. S. & A. P. Lucey
Att'ys.

J. W. CUBBAGE.

LEATHER SCOURING AND WRINGING MACHINE.

No. 9,824. Reissued Aug. 2, 1881.

Witnesses:
C. M. Sites
M. Phillips

Inventor
John W. Cubbage
By R. S. & A. P. Lacey Att'ys.

UNITED STATES PATENT OFFICE.

JOHN W. CUBBAGE, OF GALLIPOLIS, OHIO.

LEATHER SCOURING AND WRINGING MACHINE.

SPECIFICATION forming part of Reissued Letters Patent No. 9,824, dated August 2, 1881.

Original No. 235,131, dated December 7, 1880. Application for reissue filed May 13, 1881.

*To all whom it may concern:*

Be it known that I, JOHN W. CUBBAGE, of Gallipolis, in the county of Gallia and State of Ohio, have invented certain new and useful Improvements in Leather Scouring and Wringing Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
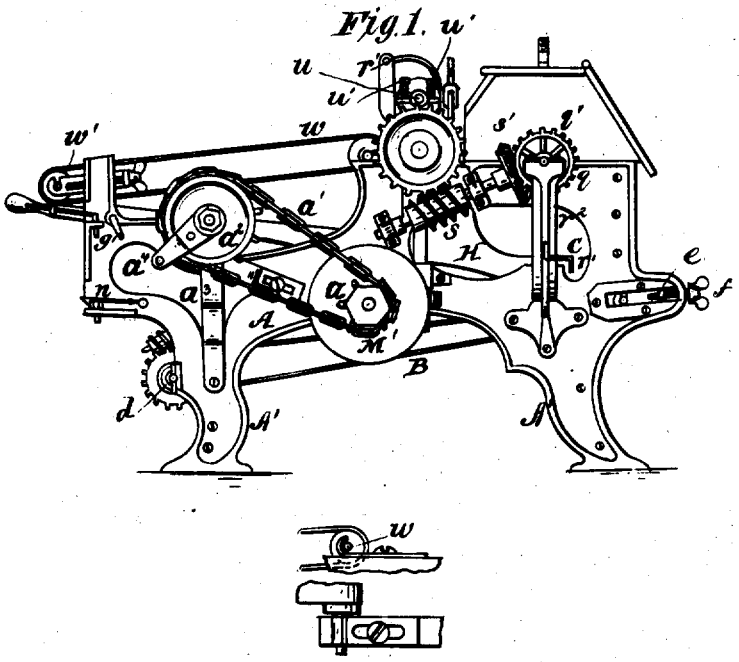
Figure 2:
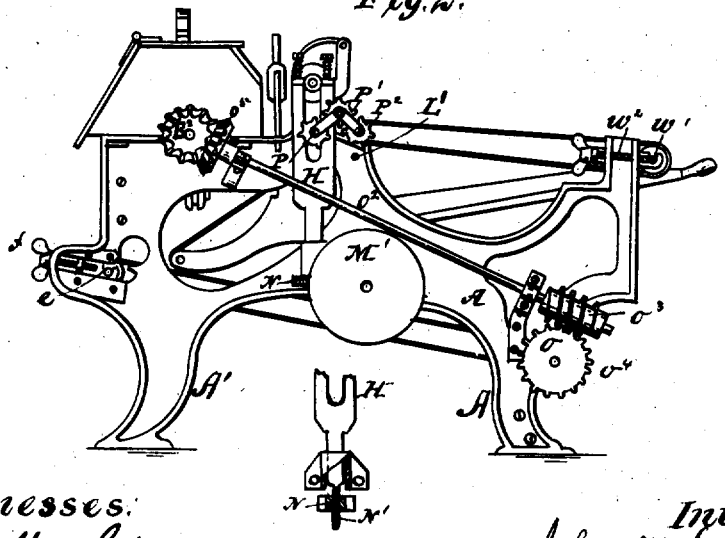
Figure 3:
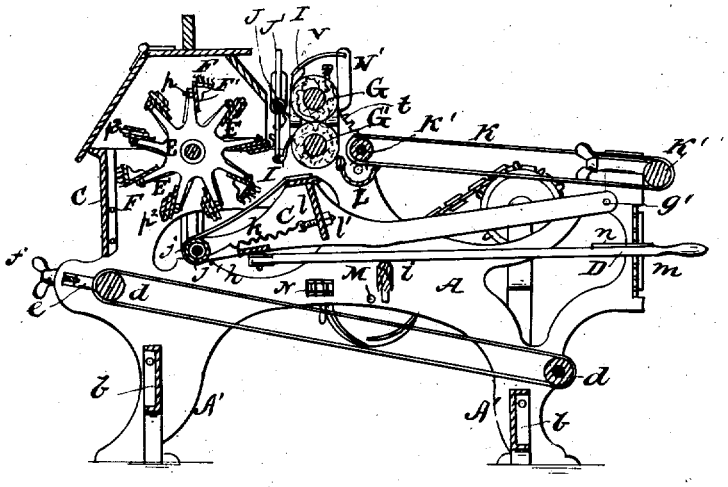

Figure 1 is a side elevation of my improved leather scourer, wringer, &c. Fig. 2 is a similar view taken from the opposite side of the machine. Fig. 3 is a longitudinal section of the same, and Figs. 4 to 8 are detail views thereof.

This invention relates to improvements in machines for tanners' use, principally for scouring to aid the tanning of and wringing leather, and for working hides out of the bate. It is further applicable for breaking and softening hard dry hides, as well as unhairing and slicking hides; and the nature of my invention consists of the combination and arrangement of parts, substantially as hereinafter more fully set forth and claimed.

In the accompanying drawings, A A indicate side supports or castings, with suitable legs, A′ A′, which are connected together by transverse pieces *b*, and the side pieces or supports by the end board, *c*, all securely bolted in position.

B is a rearwardly-inclined endless apron encompassing rolls *d d*, one journaled in fixed boxes at the rear end of the machine and the other journaled in sliding boxes *e*, operated in slots in the forward ends of the supports A by the adjusting or thumb screws F. This permits of the tightening up of the belt or apron as occasion may require, and also of slackening up on it to relieve it of strain when not in use, and that the roll *d*, working in the sliding boxes *e*, may be taken out and the apron folded up under the front end of the machine, when the latter is used for wringing purposes.

C is the work-table upon which the leather (or hides) is worked or treated while being scoured or otherwise acted upon by the working-wheel, hereinafter described. This table has two side bars, *g*, with their rear ends hung upon the removable rod *g′* at the rear end of the machine. The forward end of the table is supported, so as to yield more or less vertically to any undue pressure exerted thereon while working the hides or leather, upon the forward ends of a two-armed lever, D, connected detachably to the under side of the table. Short projections or studs *h*, depending from the table, enter apertures in the forward ends of the lever, to form the connection between them. The fulcrum of the lever D is a cross-bar, *i*, vertically adjustable in the side supports or pieces, A, to permit of adjusting the height of the table, when needed. The table also has a flexible or elastic surface with one end secured to a cross-bar fastened upon elevations of the bars *g*, while its forward end is carried around, or rather against, a series of small cylinders or rolls, *j*, slipped upon a rod or bar, *j′*, secured in the forward ends of the bars *g*, as clearly shown in Fig. 3. It is then connected to a series of springs, *k*, the opposite ends of which are secured to a board, *l*, of the table by means of adjustable bolts or nuts *l′*.

The series of short cylinders J permits the flexible table to give or yield at any one or more points to lumps or from any other cause, while the springs keep the table properly stretched and tightly drawn, the tension being regulated by the bolt and nut.

The rear end of the lever is adapted to engage and be held at any desired height of adjustment by a rack, *m*. The rack *m* has its arms pivoted in the rear end of one of the supports A, so as to permit it to be swung from one side of the support to the other, and is secured in a fixed position by a spring-pawl, *n*. The rack, being adapted to swing, can be turned out of the way for removing the work-table.

Figure 4:
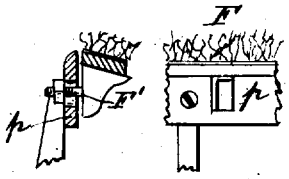
Figure 5:
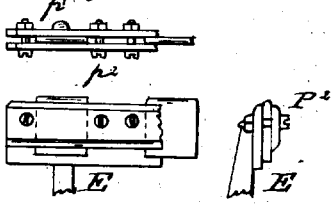
Figure 6:
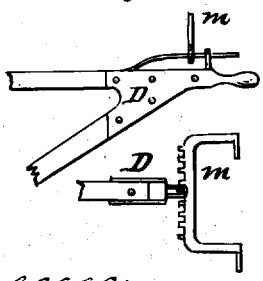
Figure 7:
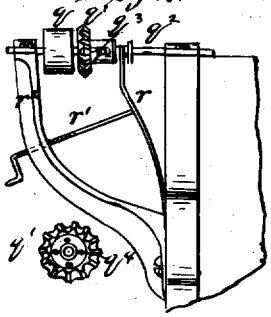
Figure 8:
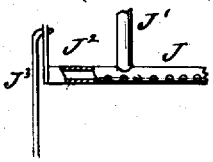

E is the working-wheel, with its shaft hung upon the upper edge of the forward ends of the side pieces, A, and having a cog-wheel, *o*. This wheel gears with a pinion on a shaft, $o^2$, hung in boxes on one side of the machine, and having a worm, $o^3$, gearing with a pinion, $o^4$, on the shaft of one of the rolls of the hide-returning apron B, to impart motion to said apron. This arrangement permits of the simultaneous operation of the working or scouring wheel and the apron B. The wheel E has series of radial arms or spokes E′ attached to each of a number of hubs fitted upon the shaft, and secured to these arms or spokes are longitudinal boards $p$, being of same length with and arranged edgewise or radially edgewise to the axis of the wheel. Some of these boards have connected to them right-angularly-arranged boards or brushes F, which are capable of vertical adjustment by means of nutted screw-bolts passing through slots in the boards, and formed with brackets F′, fastened to the backs or boards of the brushes, as seen in Figs. 3 and 4. These brushes wipe or remove surplus water from the leather or hides. Other of these boards $p$ have connected to them parallel boards $p'$ by bolts with intermediate spaces to receive and permit of the clamping between them of stones or scourers $p^2$. These stones or scourers are disposed around the wheel—say about two consecutive rows—extending in the direction of the length of the wheel to a brush, by which arrangement, as the leather (or hides) is acted upon or scoured by the scourers such will be followed by the action of a brush, and thus scour and simultaneously wipe off the sediment and the water after it has had the effect to clean, and with the scourers to open the pores and soften the leather or hides.

Upon the shaft of the scouring or working wheel is a band-pulley, $q$, having an attached gear-wheel, $q'$, and a clutch-sleeve, $q^2$, both being loose upon the shaft, while projecting transversely through and from the shaft is a pin, $q^3$, and from the side of the gear-wheel $q'$ projections $q^4$. The clutch-sleeve $q^2$ has slots indenting it to receive the pin $q^3$ to cause it to turn with the scourer-shaft. It is also capable of sliding upon the shaft to enable it to be slid up to and its slots to receive the projections $q^4$ upon the wheel $q'$, in engagement with which it is held by a spring, $r$, to cause the band-pulley $q$ and wheel $q'$ to revolve with the shaft.

A hand or crank screw, $r'$, working in a bracket, $r^2$, of one of the side pieces, A, is adapted by turning the screw with the hand to permit of releasing and applying the clutch-sleeve, as occasion may require.

Hung obliquely in boxes on one side of the machine is a shaft with a screw or worm, $s$, and a pinion, $s'$, which engages with the gear-wheel $q'$. This gearing, in connection with a pinion on one of the feed-rolls, presently described, permits of the simultaneous operation of the feed-rolls and the scourer.

G G′ are the feed-rolls, one having its shaft provided with a pinion, $t$, gearing with the worm $s$, as aforesaid, and journaled in boxes upon the upper edges of the side pieces, A. The upper roll is hung in boxes $u$, supported and retained in position by the upper ends of bifurcated or slotted uprights or slides H, suitably supported upon the sides of the machine. The journal-boxes $u$ have a limited upward movement, and are yieldingly held down upon the shaft of the roll by means of springs $w'$ $w'$, nutted upon rods or extensions of upright supports carried above the boxes, as shown in Figs. 1 and 2, to secure pressure upon and to allow for unevenness in the leather or hides as they are fed between the rolls down under the scourer and to and upon the work-table.

To prevent adherence of the leather or hides to the rolls G, scrapers I I′ are arranged so as to bear against the rolls, the lower one being held by a spring or otherwise, and the other one, which is hung by arms V, pivoted in uprights V′, suitably secured in position, caused to rest against the upper roll by gravity.

J is a sprinkler hung between the feed-rolls and the scourer, to sprinkle water upon the leather or hides as they pass from the rolls under the scourer. It consists, mainly, of a serially-perforated tube with a pipe or nozzle, J′, to which a hose or pipe may be connected leading from the supply of water or service-pipe for supplying water to the sprinkler. The tube is provided with upwardly-extending arms $J^2$, hung upon uprights or rods $J^3$, attached to the sides A. The leather or hide is fed to the feed-rolls upon the endless apron K, encompassing rolls K′. The shaft of one of these rolls—that contiguous to the lower feed-roll—bears in boxes $w$, which consist each of a hook-shaped or curved plate with a slot in its horizontal portion, where it is attached to the upper edge of the sides A, to permit of the adjustment of the said roll to allow for differences in the thickness of the apron without its coming in contact with the lower feed-roll. The boxes $w'$ of the other roll-shaft are capable of adjustment by means of the adjusting-screws $w^2$, as seen in Figs. 1 and 2, to allow of stretching or tightening and loosening it, as occasion may require.

L is a trough, preferably with a semicircular bottom and a discharge-spout, L′, Fig. 2, and secured under the forward end of the apron K with its side edges, one resting against the lower feed-roll and the other against the lower side of the apron aforesaid, provided with any suitable material adapted to wipe off the roll and apron to free them of water while wringing the leather; but, if desired, the trough may or may not have attached to it means for acting on the lower feed-roll and apron, as aforesaid.

M is a shaft hung on the side supports, A, with wheels M′ on its ends, whose blades or teeth are adapted to engage and revolve pinions N, free to revolve upon short screw-shafts N′, formed on the lower ends of the uprights H. As the pinions N are rotated they will effect the vertical adjustment of the standards to permit of the widening or narrowing of the space between the feed-rolls, to accommodate the thickness of the leather or hides to be passed between them.

A sprocket or rag wheel, $a$, fixed to the shaft M, with a chain-belt, $a'$, passing around it, and a similar wheel, $a^2$, suitably journaled upon a bracket, $a^3$, fastened to one of the side supports, A, and having a crank, $a^4$, permits of the operation of the shaft M with its wheels, and the consequent vertical adjustment of the standards H with the upper feed-roll. The lower feed-roll is geared and imparts motion to the forward roll of the feed-apron K by the gearing P P′ $P^2$, adapted to permit of the said roll having a relative adjustment to the said feed-roll, as before stated.

When the operation of wringing is to be performed the supply of water is cut off from the sprinkler, the scourer put out of operation, the work-table removed, and the apron K folded up or under the machine out of the way. The scourer can be adapted to permit of the slicking and unhairing of the hides by accordingly substituting in lieu of the stones and brushes means suited to those ends. It is capable of breaking and softening hard dry hides.

Having thus fully described my invention, I claim and desire to secure by Letters Patent—

1. The table C, with its flexible surface passed around a series of sectional cylinders, *j*, fitted upon a cross-bar, *j′*, of the table-frame, substantially as and for the purpose set forth.

2. The table C, with its flexible surface passed around a cylinder or bar, in combination with springs *k*, substantially as and for the purpose specified.

3. The combination, with the table C, with its arms *g* hung at the ends of the machine, of the lever D, fulcrumed upon the bar *i*, and with its outer end adapted to engage with a rack, *m*, substantially as and for the purpose specified.

4. The combination, with the feed-rolls G G′, of the scrapers I I′, pressing against the rolls by gravity or spring-pressure, substantially as and for the purpose set forth.

5. The sprinkler J, composed of a serially-perforated pipe or tube suspended by arms $J^2$ from standards $J^3$, substantially as and for the purpose set forth.

6. The bracket F′, provided with a projecting pin or means whereby it may be secured in place and adjusted to or from the center of motion of the wheel E, and having its outer side or edge made straight and at a suitable angle to the radial arm of said wheel, and the brush F, made fast to the outer straight edge of the bracket and adjustable therewith, substantially as set forth.

7. The bracket F′, provided with an adjusting-screw and having one edge abutted against the radial arm of the scouring-wheel E, and its outer edge flattened to be nearly parallel with the arc described by the outer ends of the arms of the scouring-wheel, and adapted to carry a brush or other scouring device, substantially as set forth.

8. The combination, substantially as hereinbefore set forth, of the feed-apron having its inner end arranged near to the feed-rolls, the lower feed-roll arranged to receive the hide from the feed-apron, the trough L, having one of its edges placed against the periphery of the lower feed-roll and its other edge placed below the inner end of the feed-apron, substantially as set forth.

9. The combination, with the endless-belt feed-apron K, having its inner end arranged near to the feed-rolls, and the lower feed-roll, G′, of the trough L, having one of its edges placed near to the periphery of the lower feed-roll and its other edge placed below the inner end of and near to the feed-apron, and wipers fixed on the edges of the trough and arranged to sweep the roll and apron and force the wipings into the trough, substantially as set forth.

10. The combination, with the upper feed-roll-supporting standards H, having screw-shafts N′, provided with pinions N, of the wheels M′ and their operating mechanism, substantially as and for the purpose set forth.

11. In a leather-treating machine, the adjustable standards H, placed on opposite sides of the machine and arranged to support the upper feed-rolls in proper position, substantially as set forth.

12. The combination, with the flexible table, of a series of rollers or cylinders, *j*, arranged below it, and so that they will support the forward end of the flexible table, for the purposes set forth.

13. The combination, substantially as hereinbefore set forth, of the flexible surface of the table C, having one end made fast to the framing of the table and the other end carried around a roller, *j*, journaled in the ends of the side bars of said table, the extensible springs *k*, having one of their ends made fast to the free end of the flexible surface of the table, and their other ends secured to set-screws *l′*, substantially as set forth.

14. In a leather scouring and wringing machine, the working-wheel E, constructed with a series of radial arms, E′, and provided with the series of longitudinal boards *p*, of same length with, and fixed to the outer ends of, the said arms, and arranged edgewise to the axis of the wheel and adapted to support the brushes or scouring-stones, &c., substantially as set forth.

15. The combination of the apron K, having its inner end supported by a roll, K′, provided with a gear, $P^2$, the adjustable feed-roll G, having gear P and intermediate gear, P′, the gear-wheels being connected together by suitable bars, so as to permit a relative adjustment of the feed-rolls, substantially as set forth.

16. The combination, with the shaft of the working-wheel and the pulley and miter-gear *q q′*, fixed on the said shaft, of the sliding clutch $q^3$, placed upon the shaft of the working-wheel, spring *r*, and set-screw *r′*, arranged to operate substantially as set forth.

17. In a leather scouring and wringing machine, the combination of the working-wheel journaled at the rear upper end of the framing, and provided with a gear on the end of its shaft, the apron arranged below the working-table, and having its forward end supported on a roll, *d*, provided with a gear, $o^4$, shaft $o^2$, supported in boxes on the framing, and provided on its ends with a worm-wheel, $o^3$, meshing with gear $o^4$, and gear $o^5$, meshing with gear E′, substantially as set forth.

18. In a machine for treating leather, the combination of the wringing apparatus, the scouring apparatus, and a single train of gear-wheels for operating both sets of apparatus, all arranged substantially as set forth.

In testimony that I claim the foregoing I have hereunto set my hand this 9th day of May, A. D. 1881.

JOHN W. CUBBAGE.

Witnesses:
C. W. WHITE,
W. W. MARTINDALE.